United States Patent
Kong

(10) Patent No.: US 10,199,053 B2
(45) Date of Patent: Feb. 5, 2019

(54) METHOD, APPARATUS FOR ELIMINATING POPPING SOUNDS AT THE BEGINNING OF AUDIO, AND STORAGE MEDIUM

(71) Applicant: TENCENT TECHNOLOGY (SHENZHEN) COMPANY LIMITED, Shenzhen, Guangdong (CN)

(72) Inventor: Lingcheng Kong, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 15/710,359

(22) Filed: Sep. 20, 2017

(65) Prior Publication Data

US 2018/0012620 A1 Jan. 11, 2018

Related U.S. Application Data

(63) Continuation of application No. PCT/CN2016/084018, filed on May 31, 2016.

(30) Foreign Application Priority Data

Jul. 13, 2015 (CN) .......................... 2015 1 0408572

(51) Int. Cl.
*G10L 21/0216* (2013.01)
*G10L 21/0272* (2013.01)
(Continued)

(52) U.S. Cl.
CPC .............. *G10L 25/78* (2013.01); *G10L 15/02* (2013.01); *G10L 21/0216* (2013.01);
(Continued)

(58) Field of Classification Search
CPC . G10L 21/02; G10L 21/0208; G10L 21/0216; G10L 21/0272; G10L 21/0308;
(Continued)

(56) References Cited

U.S. PATENT DOCUMENTS 4,665,548 A * 5/1987 Kahn ...................... G10L 25/00
704/237
5,596,680 A * 1/1997 Chow ..................... G10L 25/87
704/248

(Continued)

FOREIGN PATENT DOCUMENTS

CN 1655229 A 8/2005
CN 101477801 A 7/2009
(Continued)

OTHER PUBLICATIONS

Office Action Issued in Chinese Application No. 201510408572.8 dated Jul. 3, 2017, 6 pages.

(Continued)

*Primary Examiner* — Eric Yen
(74) *Attorney, Agent, or Firm* — Knobbe Martens Olson & Bear LLP

(57) ABSTRACT

A method and apparatus for eliminating popping sounds at the beginning of audio includes: examining audio frames within a pre-set time period at the beginning of audio to determine a popping residing section; applying popping elimination to audio frames in the popping residing section; calculating an average value of amplitudes of M audio frames preceding the popping residing section and an average value of amplitudes of K audio frames succeeding the popping residing section; setting the amplitudes of the audio frames in the popping residing section to zero in response to a determination that the two average values are both smaller than a pre-set sound reduction threshold; weakening the amplitudes of the audio frames in the popping residing section in response to a determination that both the two average values are not smaller than a pre-set sound reduction threshold; M and K are integers larger than one.

15 Claims, 2 Drawing Sheets

(51) Int. Cl.
*G10L 21/0332* (2013.01)
*G10L 25/78* (2013.01)
*G10L 15/02* (2006.01)
*G10L 25/21* (2013.01)

(52) U.S. Cl.
CPC ...... *G10L 21/0272* (2013.01); *G10L 21/0332* (2013.01); *G10L 25/21* (2013.01); *G10L 2025/783* (2013.01)

(58) Field of Classification Search
CPC ............. G10L 21/0316; G10L 21/0324; G10L 21/0332; G10L 21/034; G10L 21/0364; G10L 25/15; G10L 25/21
See application file for complete search history.

(56) References Cited

U.S. PATENT DOCUMENTS

| | | | | |
|---|---|---|---|---|
| 5,611,019 | A * | 3/1997 | Nakatoh | G10L 15/063 704/233 |
| 5,774,847 | A * | 6/1998 | Chu | G10L 25/78 704/219 |
| 6,157,906 | A * | 12/2000 | Nicholls | G10L 25/78 704/214 |
| 6,529,866 | B1 * | 3/2003 | Cope | G10L 21/0208 381/94.3 |
| 8,364,294 | B1 * | 1/2013 | Moulios | G11B 27/34 369/4 |
| 2002/0007270 | A1 * | 1/2002 | Murashima | G10L 25/78 704/215 |
| 2002/0131513 | A1 | 9/2002 | Tanaka et al. | |
| 2004/0267543 | A1 * | 12/2004 | Ojanpera | G10L 19/008 704/500 |
| 2005/0199064 | A1 | 9/2005 | Wen et al. | |
| 2007/0100611 | A1 * | 5/2007 | Ps | G10L 21/0208 704/213 |
| 2009/0240490 | A1 * | 9/2009 | Kim | G10L 19/005 704/207 |
| 2011/0123033 | A1 | 5/2011 | Wu | |
| 2013/0132076 | A1 | 5/2013 | Yang et al. | |
| 2013/0166291 | A1 * | 6/2013 | Lech | G10L 17/26 704/232 |
| 2013/0294615 | A1 | 11/2013 | Lee | |
| 2014/0040552 | A1 | 2/2014 | Rychlik et al. | |

FOREIGN PATENT DOCUMENTS

| | | |
|---|---|---|
| CN | 102082983 A | 6/2011 |
| CN | 103384154 A | 11/2013 |
| CN | 104167209 A | 11/2014 |
| CN | 105118520 A | 12/2015 |
| JP | 2002-006890 A | 1/2002 |
| KR | 2008-0067237 A | 7/2008 |

OTHER PUBLICATIONS

International Search Report for International Application No. PCT/CN2016/084018 dated Aug. 22, 2016, 3 pages.

* cited by examiner

METHOD, APPARATUS FOR ELIMINATING POPPING SOUNDS AT THE BEGINNING OF AUDIO, AND STORAGE MEDIUM

The present disclosure is a continuation application of pending International Application PCT/CN2016/084018, filed on May 31, 2016, which claims priority to Chinese Patent Application No. 201510408572.8 titled "Method and apparatus for eliminating popping sounds at the beginning of audio" and filed on Jul. 13, 2015 with the Patent Office of the People's Republic of China, the disclosures of which are hereby incorporated by reference in their entirety for all purposes.

TECHNICAL FIELD

The present disclosure relates to multimedia processing technology, and particularly, to a method, apparatus for eliminating popping sounds at the beginning of audio, and storage medium.

BACKGROUND

With developments in Internet and multimedia technology, various types of audio files can be found everywhere on the Internet, such as musical audio files (e.g., music, songs, opera, etc.), vocal audio files (e.g., comic talk show, sketch comedy, lecture, training course, etc.), or the like. Besides, there are also other types of audio-video files which include audio streams, and so on.

Some of the audio files and audio-video files have audio distortions, e.g., popping sounds at the beginning, burrs, breakpoints, etc., due to complexity in their creation, processing, transmission, storage processes. Popping sounds at the beginning of audio is a common type of distortion, and refer to short pulses at the beginning of a music waveform which may result in large distortions of the sound and severely affect auditory experiences. In a case, statistics collected from a song library shows that songs with popping sounds at the beginning account for 10% of songs in the library. Therefore, there is a need of a technical solution to the problem regarding popping sounds at the beginning of audio, to enhance the system capabilities of processing audio data and improve the playing quality of audio data.

SUMMARY

The present disclosure provides a method and apparatus for eliminating popping sounds at the beginning of audio, and storage medium, which can improve playing quality of audio data and enhance system processing capabilities.

A method for eliminating popping sounds at beginning of audio according to embodiments of the present disclosure may include:

examining audio frames within a preset time period from beginning of audio in a time domain to determine a popping residing section;

applying popping elimination to audio frames in the popping residing section;

wherein examining audio frames within a preset time period from beginning of audio in a time domain may include:

calculating a short-time energy difference between each pair of adjacent audio frames in turn in a chronological order of audio frames within the preset time period from the beginning of the audio in the time domain, determining a popping start position and a popping end position according to a pre-determined first popping threshold and the short-time energy difference calculated; or comparing a second popping threshold with a short-time energy of each audio frame in turn in a chronological order of audio frames within the preset time period from the beginning of the audio in the time domain, determining a popping start position and a popping end position according to a comparing result;

wherein the popping residing section is a section defined by the popping start position and the popping end position.

Apparatus for eliminating popping sounds at beginning of audio according to embodiments of the present disclosure may include: a processor and a memory; the memory stores application program modules executable by the processor; the application program modules comprise:

a popping residing section detecting module, to calculate a short-time energy difference between each pair of adjacent audio frames in turn in a chronological order of audio frames within a preset time period from beginning of audio in a time domain, determine a popping start position and a popping end position according to a pre-determined first popping threshold and the short-time energy difference calculated; or comparing a second popping threshold with a short-time energy of each audio frame in turn in a chronological order of audio frames within the preset time period from beginning of audio in a time domain, determine a popping start position and a popping end position according to a comparing result; and a popping eliminating module, to apply popping elimination to audio frames within the popping residing section.

A computer-readable storage medium of embodiments of the present disclosure stores computer program codes executable by a computing unit to carry out the above method for eliminating popping sounds at beginning of audio.

In view of the embodiments, popping sounds at the beginning of audio can be eliminated by applying popping elimination to audio frames within a popping residing section determined by examining audio frames within a preset time period from the beginning of the audio in a time domain. As such, playing quality of audio data can be improved, and processing capabilities of a server system can be enhanced.

BRIEF DESCRIPTION OF THE DRAWINGS

In order to make the technical mechanism of embodiments of the present disclosure more clearly, the following is a brief introduction of the drawings referred to in description of the embodiments. Obviously, the following drawings are merely some of the embodiments, and based on which other drawings can be obtained by those skilled in the art without doing any inventive work. Where.

DETAILED DESCRIPTIONS

In order to make the objectives, technical schemes and merits of the present disclosure clearer, a detailed description of the present disclosure is hereinafter given with reference to several embodiments.

Figure 1:
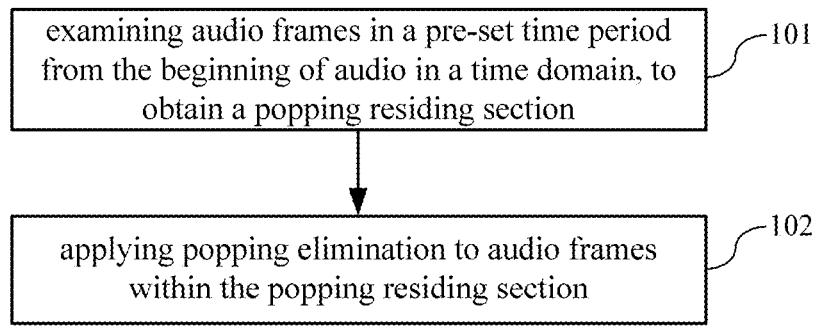
FIG. 1 is a flowchart illustrating a method for eliminating popping sounds at the beginning of audio in accordance with embodiments of the present disclosure.

FIG. 1 is a flowchart illustrating a method for eliminating popping sounds at the beginning of audio in accordance with embodiments of the present disclosure. As shown in FIG. 1, the method may include the following procedures.

At block 101, audio frames within a preset time period from the beginning of audio in decoded audio data may be examined in a time domain to determine a popping residing section.

In various embodiments, audio data may be audio data obtained from an audio file, or audio data obtained from an audio-video file.

This procedure may be implemented in various manners, and the following are two examples.

In a first example, a short-time energy difference between each pair of adjacent audio frames may be calculated in turn in a chronological order of audio frames within the preset time period from the beginning of the audio in the time domain, a popping start position and a popping end position may be determined according to a pre-determined first popping threshold and the short-time energy difference calculated. The popping residing section is a section defined by the popping start position and the popping end position.

For example, a time-domain short-time energy difference method may be applied to N audio frames within the first T seconds to detect the position of a discontinuity of short-time energy, as in the following formula (1):

$$p = E[n] - E[n-1], 1 < n < N; \quad (1)$$

In the formula, n is the position of a frame, and E[n] is the short-time energy of the n'th frame. The method of detecting the position of the popping start time and the position of the popping end time may include: determining a frame to be the popping start position tb when p is larger than a first popping threshold th; and determining a frame to be the popping end position to when p is smaller than −th. That is, audio frames within the popping residing section satisfy $$abs(p) = |E[n] - E[n-1]| > th.$$

T may be 10, or any reasonable time period, e.g., 8, 9, 11, 12, 13, or the like.

In a second example, a second popping threshold may be compared respectively with a short-time energy of each audio frame in turn in a chronological order of audio frames within the preset time period from the beginning of the audio in the time domain, and a popping start position and a popping end position may be determined according to a comparing result. The popping residing section is a section defined by the popping start position and the popping end position.

For example, the popping start position may be determined to be the position of the first audio frame whose short-time energy is larger than a second popping threshold, and the popping end position may be determined to be the position of the last audio frame whose short-time energy is larger than the second popping threshold.

Any of the methods may be used to detect the position of the discontinuity of short-time energy, thus determine the popping start position and the popping end position.

At block 102, popping elimination may be applied to audio frames within the popping residing section.

This procedure may be implemented in various manners, and the following are two examples.

According to a first example, the amplitude of audio frames within the popping residing section may be preset to be zero. This method is simple and can eliminate popping sounds at the beginning of audio.

For example, the popping elimination method may be illustrated as in the following formula (2):

$$y[n] = \begin{cases} 0, & tb \leq n \leq te \\ x[n], & \text{else} \end{cases} \quad (2)$$

In the formula, x[n] is the amplitude of an audio frame before popping elimination, y[n] is the amplitude of an audio frame after popping elimination, tb is the popping start position, and te is the popping end position.

According to a second example, an average value xb of amplitudes of M audio frames preceding the popping residing section and an average value xe of amplitudes of K audio frames succeeding the popping residing section may be calculated; the amplitudes of audio frames in the popping residing section may be set to be zero in response to a determination that the two average values calculated are both smaller than a pre-set silencing threshold; or reducing the amplitudes of the audio frames in the popping residing section in response to a determination that both the two average values calculated are not smaller than the pre-set silencing threshold. M and K are both integers larger than one. For example, M or K may be 10 or another value such as 8, 9, 11, 12, etc. M and K may have different values.

For example, the popping elimination method may be illustrated as in the following formula (3):

$$y[n] = \begin{cases} \begin{cases} 0, & tb \leq n \leq te \\ x[n], & \text{else} \end{cases}, & xb \leq TH, xe \leq TH; \\ \begin{cases} \dfrac{x[n]}{Z}, & tb \leq n \leq te \\ x[n], & \text{else} \end{cases}, & xb > TH, \text{ or } xe > TH; \end{cases} \quad (3)$$

In the formula, x[n] is the amplitude of an audio frame before popping elimination, y[n] is the amplitude of an audio frame after popping elimination, tb is the popping start position, te is the popping end position, Z is a reduction coefficient, xb is the average value of amplitudes of the M audio frames preceding the popping residing section, and xe is the average value of amplitudes of the K audio frames succeeding the popping residing section.

The reduction coefficient may be calculated according to many methods, the following are two examples.

According to a first example, a first reduction coefficient may be calculated using the largest amplitude of amplitudes of audio frames within the popping residing section and the average values of the M audio frames preceding the popping residing section and the K audio frames succeeding the popping residing section.

For example, the reduction coefficient may be calculated according to the following formula (4):

$$Z = \max(x[n]) \Big/ \frac{xb + xe}{2}, tb \le n \le te \qquad (4)$$

According to a second example, a second reduction coefficient may be calculated using the largest amplitude of amplitudes of audio frames within the popping residing section and an average value of amplitudes of audio frames within the popping residing section.

For example, the reduction coefficient may be calculated according to the following formula (5):

$$Z = \frac{\max(x[n])}{\text{mean}}, tb \le n \le te; \qquad (5)$$

$$\text{mean} = \frac{1}{te - tb + 1} \sum_{n=te}^{tb} x[n], tb \le n \le te$$

The method for eliminating popping sounds at the beginning of audio of the above embodiments of the present disclosure may be applied to a background server. The following is a description of an apparatus for eliminating popping sounds at the beginning of audio of various embodiments of the present disclosure. The apparatus may also be applied in a background server, and may carry out the methods of various embodiments of the present disclosure. Details omitted in the apparatus embodiments can be found in the descriptions related with method embodiments of the present disclosure.

Figure 2:
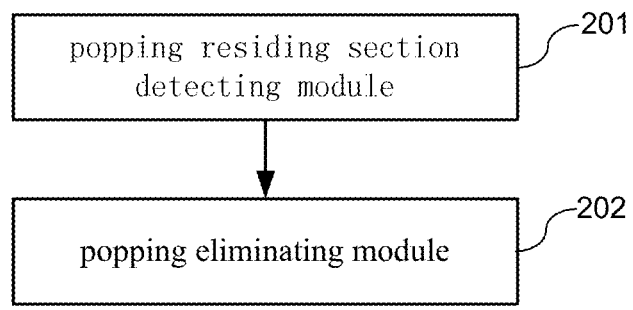
FIG. 2 is a schematic diagram illustrating modules of the apparatus for eliminating popping sounds at the beginning of audio in accordance with embodiments of the present disclosure.

FIG. 2 is a block diagram illustrating modules of the apparatus for eliminating popping sounds at the beginning of audio in accordance with embodiments of the present disclosure. As shown in FIG. 2, the apparatus may include: a popping residing section detecting module 200 and a popping eliminating module 300.

The popping residing section detecting module 200 may examine audio frames within a pre-set time period from the beginning of audio in a time domain to obtain a popping residing section.

The popping eliminating module 300 may apply popping elimination to audio frames within the popping residing section.

In an embodiment, the popping residing section detecting module 200 may calculate a short-time energy difference between each pair of adjacent audio frames in turn in a chronological order of audio frames within the pre-set time period from the beginning of the audio in the time domain, and determine a popping start position and a popping end position according to a pre-determined first popping threshold and the short-time energy difference calculated. The popping residing section is a section defined by the popping start position and the popping end position.

In another embodiment, the popping residing section detecting module 200 may compare a second popping threshold with a short-time energy of each audio frame in turn in a chronological order of audio frames within a pre-set time period from the beginning of the audio in the time domain, and determine a popping start position and a popping end position according to a comparing result. The popping residing section is a section defined by the popping start position and the popping end position.

In an embodiment, the popping eliminating module 300 may set amplitudes of audio frames within the popping residing section to be zero.

Figure 3:
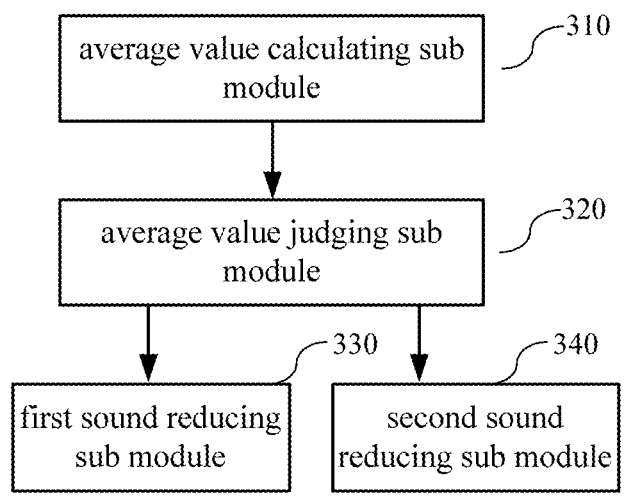
FIG. 3 is a schematic diagram illustrating a popping eliminating module of the apparatus as shown in FIG. 2.

In another embodiment, the popping eliminating module 300 may, as shown in FIG. 3, include: an average value calculating sub module 310, an average value judging sub module 320, a first sound reducing processing sub module 330 and a second sound reducing processing sub module 340.

The average value calculating sub module 310 may calculate an average value of amplitudes of M audio frames preceding the popping residing section and an average value of amplitudes of K audio frames succeeding the popping residing section. M and K are integers larger than one.

The average value judging sub module 320 may judge whether the two average values of amplitudes calculated by the average value calculating sub module are both smaller than a pre-determined silencing threshold, and triggering processing at the first sound reducing sub module in response to a determination that both the two average values are smaller than the silencing threshold; or triggering processing at the second sound reducing sub module in response to a determination that the two average values are not both smaller than the sound reduction threshold.

The first sound reducing sub module 330 may set amplitudes of audio frames within the popping residing section to be zero.

The second sound reducing sub module 340 may reduce amplitudes of audio frames within the popping residing section.

Figure 4:
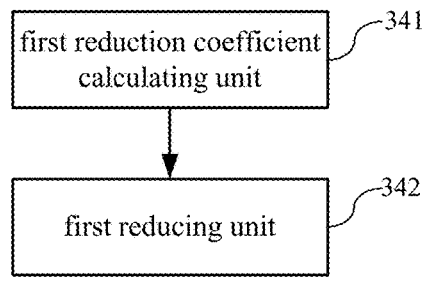
FIG. 4 is a schematic diagram illustrating a second sound eliminating sub module in the popping eliminating module as shown in FIG. 3.

In an embodiment, the second sound reducing sub module 340 may be as shown in FIG. 4, and includes a first reduction coefficient calculating unit 341 and a first reducing unit 342.

The first reduction coefficient calculating unit 340 may calculate a first reduction coefficient using the maximum value of amplitudes of audio frames within the popping residing section and the average values of the M audio frames preceding the popping residing section and the K audio frames succeeding the popping residing section.

The first reducing unit 342 may reduce amplitudes of audio frames within the popping residing section according to the first reduction coefficient.

Figure 5:
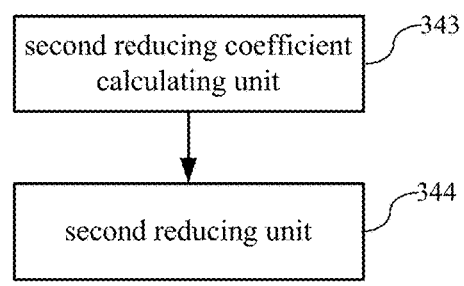
FIG. 5 is a schematic diagram illustrating another second sound eliminating sub module in the popping eliminating module as shown in FIG. 3.

In an embodiment, the second sound reducing sub module 340 may be as shown in FIG. 5, and includes a second reduction coefficient calculating unit 343 and a second reducing unit 344.

The second reduction coefficient calculating unit 343 may calculate a second reduction coefficient using the largest amplitude of amplitudes of audio frames within the popping residing section and an average value of amplitudes of audio frames within the popping residing section.

The second reducing unit 344 may reduce amplitudes of audio frames within the popping residing section according to the second reduction coefficient.

Figure 6:
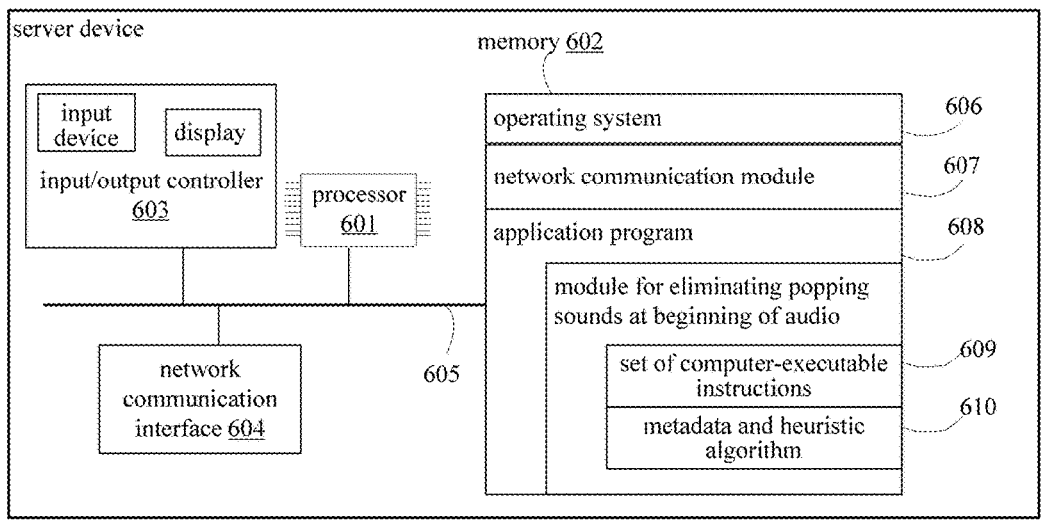
FIG. 6 is a schematic diagram illustrating modules of a background server in accordance with embodiments of the present disclosure.

FIG. 6 is a schematic diagram illustrating modules of a server in accordance with embodiments of the present disclosure. As shown in FIG. 6, the server may include: a processor 601, non-transitory computer-readable memory 602, input/output controller 603, and a network communication interface 604. The components communicate with each other through a bus 605.

In this embodiment, the memory 602 stores a plurality of program modules, e.g., an operating system 606, a network communication module 607 and an application program 608.

The processor 601 may read various modules (not shown in the drawings) of the application program in the memory 602 to execute various functions and applications of the server and process data. In various embodiments, the processor 601 may be one processor or a plurality of processors, may be a CPU, a processing unit/module, ASIC, logic modules, FPGA, or the like.

The input/output controller 503 may include a display and an input device for implementing data input, data output, data display, or the like.

The operating system 606 may include, but not limited to: Android, Symbian, Windows, Linux, or the like.

The application program 608 may include a module for eliminating popping sounds at the beginning of audio. The module may include a set of computer-executable instructions corresponding to the modules of the apparatus as shown in FIG. 2, meta data corresponding to the instructions, and a heuristic algorithm 610. The set of computer-executable instructions may be executed by the processor 601 to carry out the method as shown in FIG. 1 or implement the functions of the apparatus as shown in FIG. 2.

In this embodiment, the network communication interface 604 work together with the network communication module 606 to send and receive various network signals of the server.

Each embodiment of the present disclosure may be implemented by a data processing program executable by a data processing device, e.g., a computer. The data processing programs also form part of the present disclosure. Program codes stored in a storage medium may be executed by being read from the storage medium or being installed or copied into a storage device (e.g., a hard drive and/or memory) in a data process device. Thus, the storage medium is also part of the technical scheme. The storage medium may include paper storage medium (e.g., paper-tap and etc.), magnetic storage medium (e.g., floppy disk, hard drive, Flash card and etc.), optical storage medium (e.g., CD-ROM, and the like), magneto-optical storage medium (e.g., MO and the like) and so on.

A machine-readable storage medium is also provided, which is to store instructions to cause a machine to execute any of the embodiments as disclosed herein.

In view of the embodiments, popping sounds at the beginning of audio can be eliminated by applying popping elimination to audio frames within a popping residing section determined by examining audio frames within a preset time period from the beginning of the audio in a time domain. As such, playing quality of audio data can be improved, and processing capabilities of a server system can be enhanced.

By calculating the short-time energy difference between each pair of audio frames in turn in a chronological order of audio frames within a pre-set time period from the beginning of audio in the time domain and comparing the difference with a pre-set first popping threshold, or by directly comparing the short-time energy of each of the audio frames with a pre-set second popping threshold, the position of a discontinuity of short-time energy can be detected, and thus the popping start position and the popping end position can be obtained.

During popping elimination, computational complexity can be reduced by directly setting amplitudes of audio frames within the popping residing section to zero, i.e., popping elimination is implemented in a simple way.

Furthermore, in order to obtain a smooth auditory effect, it may be first calculated the average value of amplitudes of M audio frames preceding the popping residing section and the average value of amplitudes of K audio frames succeeding the popping residing section; amplitudes of the audio frames in the popping residing section may be set to zero in response to a determination that the two average values calculated are both smaller than a pre-set silencing threshold; and reducing the amplitudes of audio frames within the popping residing section in response to a determination that at least one of the average values is larger than the pre-set silencing threshold, so as to prevent discontinuity in audio amplitude in the popping residing section.

The scope of the claims should not be limited by the embodiments set forth in the examples, but should be given the broadest interpretation consistent with the description as a whole.

The invention claimed is:

1. A method for eliminating popping sounds at beginning of audio, comprising:
    by a server system, the server system enhancing audio prior to being played and reducing computational complexity associated with enhancing the audio, such that processing capabilities of the server system are enhanced,
    examining audio frames within a pre-set time period from beginning of audio in a time domain to determine a popping residing section which includes a plurality of audio frames presenting popping sounds;
    calculating an average value of amplitudes of M audio frames preceding the popping residing section and an average value of amplitudes of K audio frames succeeding the popping residing section;
    setting amplitudes of the plurality of audio frames in the popping residing section to be zero in response to a determination that the two average values obtained from the calculating are both smaller than a pre-set silencing threshold, wherein setting amplitudes to be zero enables, at least in part, reductions in computational complexity; and
    reducing the amplitudes of the plurality of audio frames in the popping residing section in response to a determination that both the two average values obtained from the calculating are not smaller than a pre-set silencing threshold;
    wherein M and K are integers larger than one.

2. The method of claim 1, wherein examining audio frames within a pre-set time period from beginning of audio in a time domain to determine a popping residing section comprises:
    calculating a short-time energy difference between each pair of adjacent audio frames in turn in a chronological order of audio frames within the pre-set time period from the beginning of the audio in the time domain; and
    determining a popping start position and a popping end position based on a pre-determined first popping threshold and the calculated short-time energy differences;
    wherein the popping residing section is a section defined by the popping start position and the popping end position.

3. The method of claim 1, wherein examining audio frames within a pre-set time period from beginning of audio in a time domain to determine a popping residing section comprises:
    comparing a pre-set popping threshold with a short-time energy of each audio frame in turn in a chronological order of audio frames within the pre-set time period from the beginning of the audio in the time domain, determining a popping start position and a popping end position according to a comparing result;
    wherein the popping residing section is a section defined by the popping start position and the popping end position.

4. The method of claim 1, wherein reducing the amplitudes of the audio frames in the popping residing section comprises:
- calculating a reduction coefficient using a largest amplitude of amplitudes of audio frames within the popping residing section and an average value of M audio frames preceding the popping residing section and an average value of K audio frames succeeding the popping residing section; and
- reducing the amplitudes of the audio frames in the popping residing section using the reduction coefficient.

5. The method of claim 1, wherein reducing the amplitudes of the audio frames in the popping residing section comprises:
- calculating a reduction coefficient using a largest amplitude of amplitudes of the audio frames within the popping residing section and an average value of amplitudes of audio frames within the popping residing section; and
- reducing the amplitudes of the audio frames in the popping residing section using the reduction coefficient.

6. An apparatus for eliminating popping sounds at beginning of audio, comprising: a processor and a memory; the memory stores computer-readable instructions executable by the processor to:
- examine audio frames within a pre-set time period from the beginning of audio in a time domain to obtain a popping residing section which includes a plurality of audio frames presenting popping sounds; and
- calculate an average value of amplitudes of M audio frames preceding the popping residing section and an average value of amplitudes of K audio frames succeeding the popping residing section;
- judge whether the two average values are both smaller than a pre-determined silencing threshold, set amplitudes of audio frames within the popping residing section to be zero in response to a determination that both the two average values are smaller than the silencing threshold; or reduce amplitudes of audio frames within the popping residing section in response to a determination that the two average values are not both smaller than the silencing threshold;
- wherein M and K are integers larger than one, and wherein the apparatus enhances audio prior to being played and reduces computational complexity associated with enhancing the audio, such that processing capabilities of the apparatus are enhanced.

7. The apparatus of claim 6, wherein the instructions are executable by the processor to:
- calculate a short-time energy difference between each pair of adjacent audio frames in turn in a chronological order of audio frames within the pre-set time period from beginning of audio in a time domain;
- determine a popping start position and a popping end position based on a pre-determined first popping threshold and the calculated short-time energy differences,
- wherein the popping residing section is a section defined by the popping start position and the popping end position.

8. The apparatus of claim 6, wherein the instructions are executable by the processor to:
- compare a pre-set popping threshold with an amplitude of each of audio frames in turn in a chronological order of audio frames within the pre-set time period from beginning of audio in a time domain,
- determine a popping start position and a popping end position according to a compare result,
- wherein the popping residing section is a section defined by the popping start position and the popping end position.

9. The apparatus of claim 6, wherein the instructions are executable by the processor to:
- calculate a reduction coefficient using a largest amplitude of amplitudes of audio frames within the popping residing section and an average value of M audio frames preceding the popping residing section and an average value of M audio frames succeeding the popping residing section; and
- reduce amplitudes of audio frames within the popping residing section according to the reduction coefficient.

10. The apparatus of claim 6, wherein the instructions are executable by the processor to:
- calculate a reduction coefficient using a largest amplitude of amplitudes of audio frames within the popping residing section and an average value of amplitudes of audio frames within the popping residing section; and
- reduce amplitudes of audio frames within the popping residing section according to the reduction coefficient.

11. A non-transitory computer-readable storage medium storing computer-readable instructions that, when executed by a server system of one or more processors, cause the server system to:
- examine audio frames within a pre-set time period from the beginning of audio in a time domain to obtain a popping residing section which includes a plurality of audio frames presenting popping sounds; and
- calculate an average value of amplitudes of M audio frames preceding the popping residing section and an average value of amplitudes of K audio frames succeeding the popping residing section;
- judge whether the two average values are both smaller than a pre-determined silencing threshold, set amplitudes of audio frames within the popping residing section to be zero in response to a determination that both the two average values are smaller than the silencing threshold; or reduce amplitudes of audio frames within the popping residing section in response to a determination that the two average values are not both smaller than the silencing threshold;
- wherein M and K are integers larger than one, and wherein the server system enhances audio prior to being played and reduces computational complexity associated with enhancing the audio, such that processing capabilities of the server system are enhanced.

12. The non-transitory computer-readable storage medium of claim 11, wherein the instructions are executable by the server system to:
- calculate a short-time energy difference between each pair of adjacent audio frames in turn in a chronological order of audio frames within the pre-set time period from beginning of audio in a time domain;
- determine a popping start position and a popping end position based on a pre-determined first popping threshold and the calculated short-time energy differences,
- wherein the popping residing section is a section defined by the popping start position and the popping end position.

13. The non-transitory computer-readable storage medium of claim 11, wherein the instructions are executable by the server system to:

compare a pre-set popping threshold with an amplitude of each of audio frames in turn in a chronological order of audio frames within the pre-set time period from beginning of audio in a time domain, determine a popping start position and a popping end position according to a compare result, wherein the popping residing section is a section defined by the popping start position and the popping end position.

14. The non-transitory computer-readable storage medium of claim 11, wherein the instructions are executable by the server system to:

calculate a reduction coefficient using a largest amplitude of amplitudes of audio frames within the popping residing section and an average value of M audio frames preceding the popping residing section and an average value of K audio frames succeeding the popping residing section; and reduce amplitudes of audio frames within the popping residing section according to the reduction coefficient.

15. The non-transitory computer-readable storage medium of claim 11, wherein the instructions are executable by the server system to:

calculate a reduction coefficient using a largest amplitude of amplitudes of audio frames within the popping residing section and an average value of amplitudes of audio frames within the popping residing section; and reduce amplitudes of audio frames within the popping residing section according to the reduction coefficient.

* * * * *